United States Patent
Yoon et al.

(10) Patent No.: US 8,012,623 B2
(45) Date of Patent: Sep. 6, 2011

(54) MEDIUM AND LARGE SIZE BATTERY MODULE OF VERTICAL STACKING STRUCTURE

(75) Inventors: Junill Yoon, Seoul (KR); Ji Hoon Han, Daejeon (KR); Jong-yul Ro, Seoul (KR); Jae Hun Yang, Daejeon (KR); John E. Namgoong, Daejeon (KR)

(73) Assignee: LG Chem, Ltd. (KR)

( * ) Notice: Subject to any disclaimer, the term of this patent is extended or adjusted under 35 U.S.C. 154(b) by 155 days.

(21) Appl. No.: 12/223,827

(22) PCT Filed: Jan. 12, 2007

(86) PCT No.: PCT/KR2007/000211
§ 371 (c)(1),
(2), (4) Date: Oct. 26, 2009

(87) PCT Pub. No.: WO2007/094568
PCT Pub. Date: Aug. 23, 2007

(65) Prior Publication Data
US 2010/0255363 A1 Oct. 7, 2010

(30) Foreign Application Priority Data
Feb. 13, 2006 (KR) .................. 10-2006-0013609

(51) Int. Cl.
*H01M 6/46* (2006.01)
*H01M 6/42* (2006.01)
*H01M 2/00* (2006.01)

(52) U.S. Cl. ......... 429/153; 429/151; 429/156; 429/163

(58) Field of Classification Search .................. 429/153, 429/151, 156, 163
See application file for complete search history.

(56) References Cited

U.S. PATENT DOCUMENTS

| 4,957,829 A | 9/1990 | Holl |
| 6,275,003 B1 | 8/2001 | Marukawa et al. |
| 2003/0017387 A1 | 1/2003 | Marukawa et al. |
| 2003/0118898 A1 | 6/2003 | Kimura et al. |
| 2004/0058233 A1 | 3/2004 | Hamada et al. |

FOREIGN PATENT DOCUMENTS

| JP | 2001-068081 A | 3/2001 |
| JP | 2003-346749 A | 5/2003 |
| JP | 15-346749 A2 | 12/2003 |
| JP | 2004-047426 A | 2/2004 |
| KR | 2007-0043515 A | 4/2007 |
| KR | 2006-12303 | 8/2007 |
| KR | 2007-0080861 A | 8/2007 |

OTHER PUBLICATIONS

Office Action from Korean Patent Application No. 10-2006-0013609, dated Sep. 17, 2009.

*Primary Examiner* — Helen O Conley
(74) *Attorney, Agent, or Firm* — Lerner, David, Littenberg, Krumholz & Mentlik, LLP

(57) ABSTRACT

Disclosed herein is a battery module constructed in a structure in which unit modules are horizontally stacked while the unit modules are vertically erected, wherein the battery module includes a base plate on which the unit modules are horizontally stacked while the unit modules are vertically erected, a pair of side plates fixed to the base plate at lower ends thereof such that the side plates are brought into tight contact with outer surfaces of the outermost unit modules, and a housing fixed to the base plate in a structure to surround the unit modules, the housing being provided at the inside thereof with supporting parts for supporting upper ends of the side plates, respectively.

10 Claims, 3 Drawing Sheets

[Fig. 1]
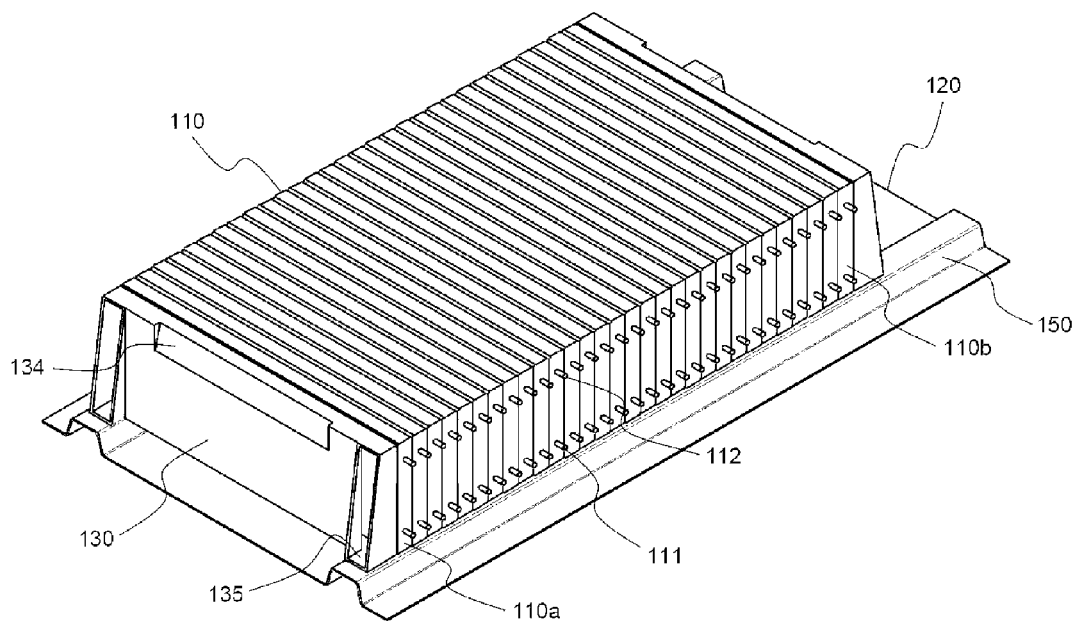
[Fig. 2]
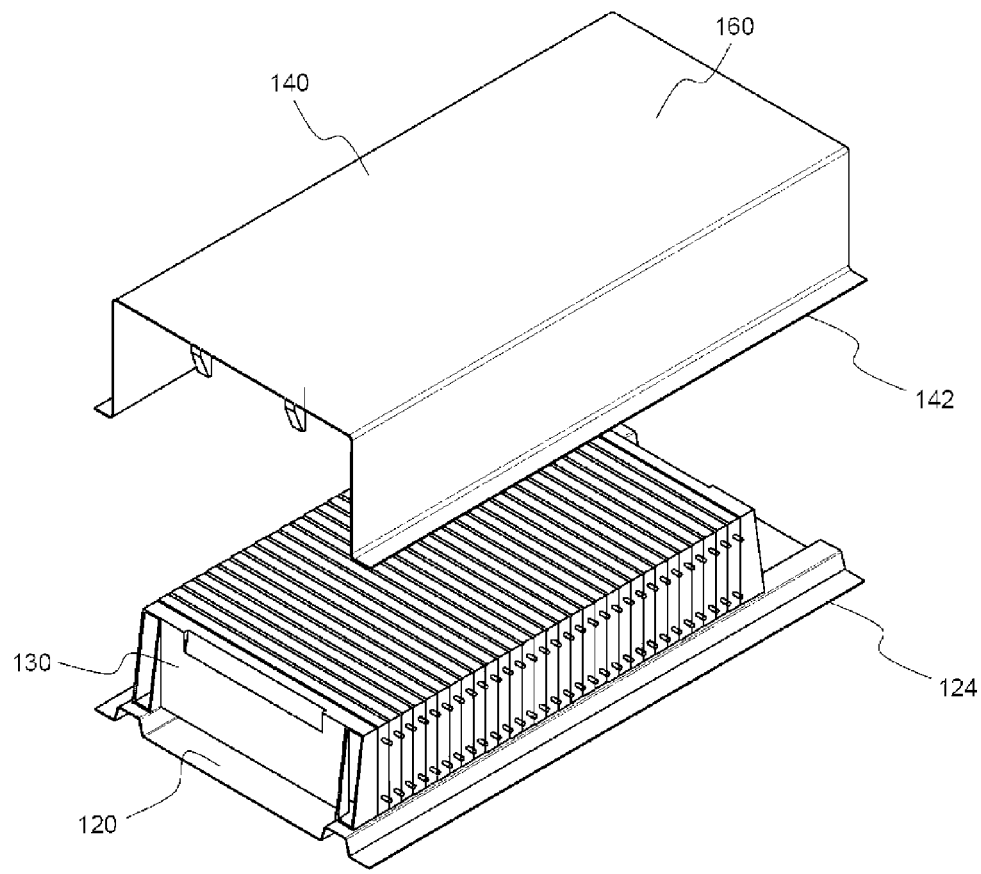

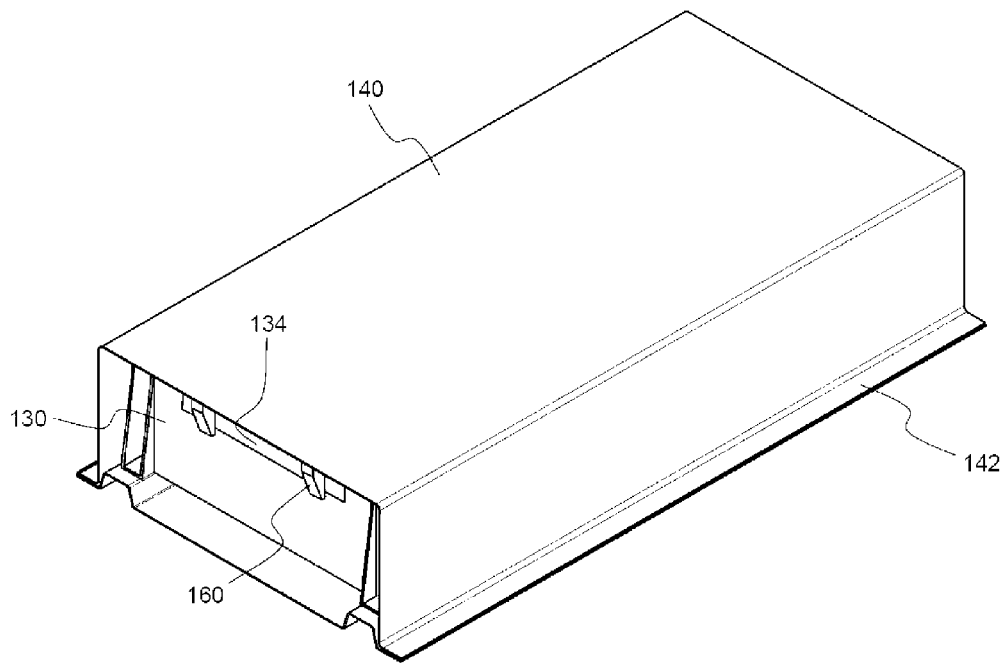
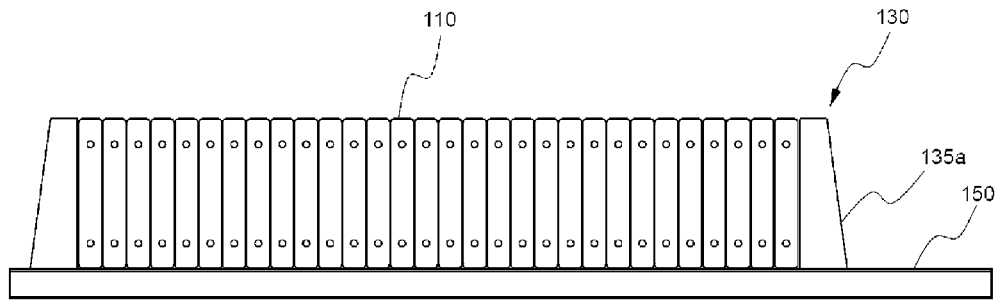
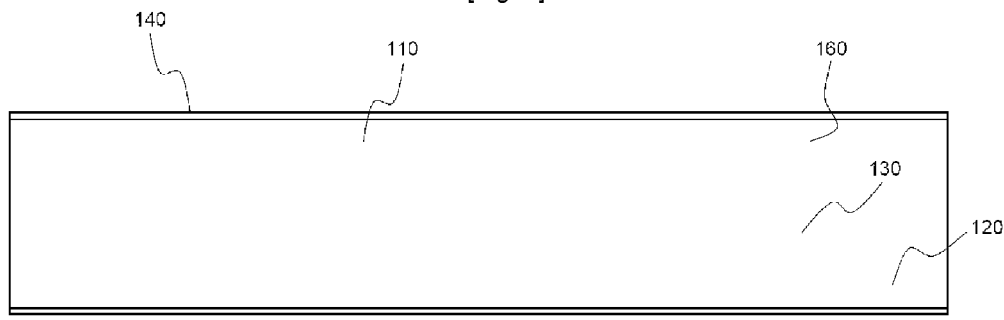

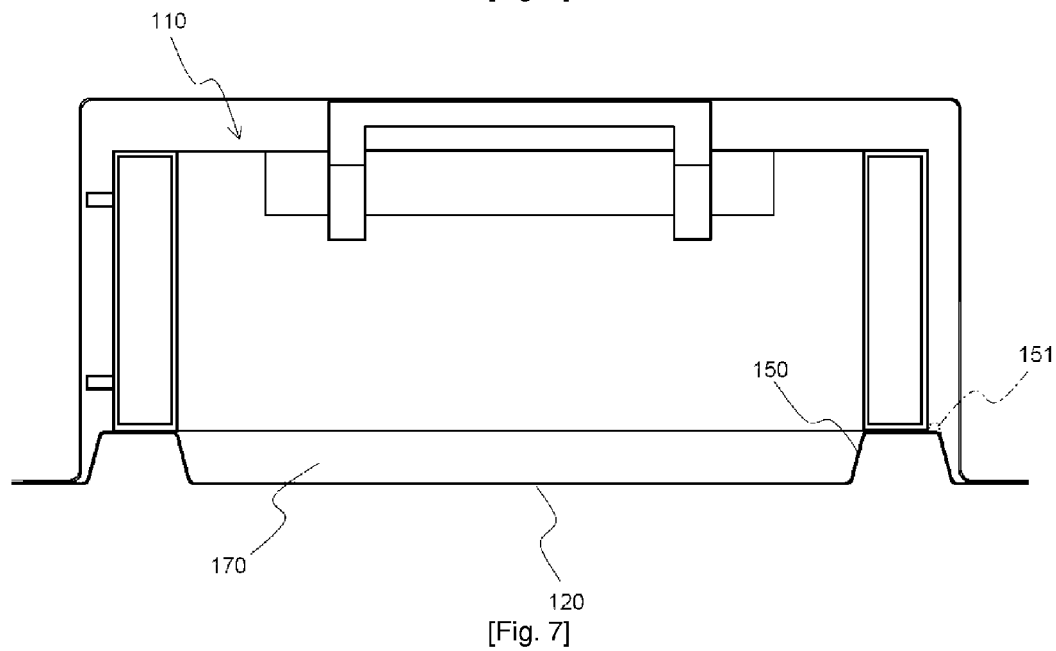
[Fig. 6]
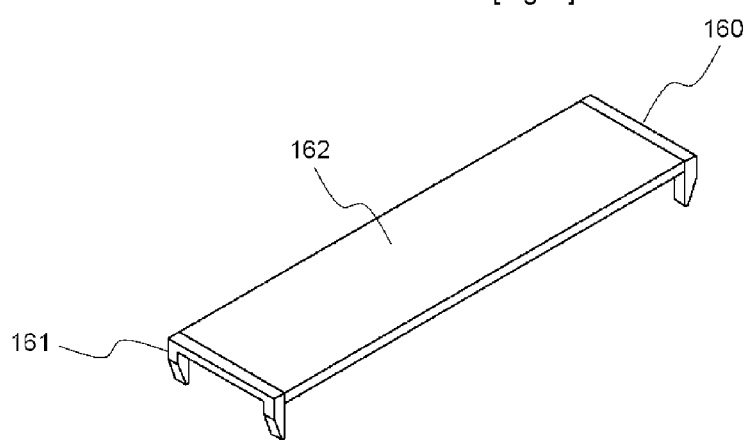
[Fig. 7]

MEDIUM AND LARGE SIZE BATTERY MODULE OF VERTICAL STACKING STRUCTURE

The present application is U.S. national stage of international application PCT/KR2007/000211, filed on Jan. 12, 2007 and claims benefit under 35 U.S.C 119 filed in the Korean Intellectual Property Office on Feb. 13, 2006 and there duly assigned 10-2006-0013609.

TECHNICAL FIELD

The present invention relates to a medium- or large-sized battery module constructed in a horizontal stacking structure, and, more particularly, to a battery module constructed in a structure in which unit modules are horizontally stacked while the unit modules are vertically erected, wherein the battery module includes a base plate on which the unit modules are horizontally stacked while the unit modules are vertically erected, a pair of side plates fixed to the base plate at lower ends thereof such that the side plates are brought into tight contact with outer surfaces of the outermost unit modules, and a housing fixed to the base plate in a structure to surround the unit modules, the housing being provided at the inside thereof with supporting parts for supporting upper ends of the side plates, respectively.

BACKGROUND ART

One of the biggest problems caused by vehicles using fossil fuel, such as gasoline and diesel oil, is creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has been attempted.

High output and large capacity are needed for such a secondary battery to be used as the power source for the electric vehicles (EV) and the hybrid electric vehicles (HEV). For this reason, a plurality of small-sized secondary batteries (unit cells) are connected in series or, according to circumstances, in series and parallel with each other so as to construct a battery module.

Generally, unit cells have low mechanical strength. For this reason, a battery module is manufactured by mounting a plurality of unit cells in a cartridge and electrically connecting a plurality of cartridges with each other. However, the cartridges increase the size of the battery module. In order to solve this problem, U.S. Patent Application Publication No. 2003-0017387 and U.S. Patent Application Publication No. 2003-0118898 disclose a medium- or large-sized battery module manufactured by horizontally stacking a plurality of unit cells and mounting pipe- or strip-shaped fixing members to upper and lower ends of the unit cells so as to maintain the stacking structure of the unit cells. However, these technologies have problems in that the unit cells and the fixing members are individually mounted to a housing member of the battery module, whereby the structure of the battery module is complicated and thus the assembly process of the battery module is complicated, and a flow channel of a cooling system is interrupted due to the fixing members, whereby the cooling efficiency of the battery module is reduced.

On the other hand, the battery module constructed in the horizontal stacking structure has a problem in that, when gas is generated in the unit cells during the operation of the battery module, the distance between electrodes of the unit cells is increased, and therefore, the battery efficiency is decreased. Furthermore, when the unit cells swell in the thickness direction of the unit cells due to the generated gas, the shape of the electrodes may be changed with the result that internal short circuits may occur.

Consequently, there is high necessity of a battery module constructed in a horizontal stacking structure that is capable of stably maintaining the stacking structure of unit cells, preventing the swelling of the unit cells, when gas is generated in the unit cells, by virtue of a structure in which the unit cells are in tight contact with each other, and maintaining the distance between electrodes of the unit cells, thereby preventing the lowering of the battery efficiency.

DISCLOSURE OF INVENTION

Technical Problem

Therefore, the present invention has been made to solve the above-mentioned problems, and other technical problems that have yet to be resolved.

Specifically, it is an object of the present invention to provide a battery module that is capable of stably maintaining the stacking structure of secondary batteries or unit modules each having two or more secondary batteries mounted therein, preventing the swelling of the batteries, when gas is generated in the batteries, by virtue of a structure in which the batteries are in tight contact with each other, and maintaining the distance between electrodes of the batteries, thereby maximally restraining the lowering of the battery efficiency.

It is another object of the present invention to provide a battery module constructed such that a portion of the battery module is formed using the shape of a vehicle in which the battery module is mounted, whereby the battery module is stably mounted in the vehicle and the volume of the battery module in the vehicle is minimized.

Technical Solution

In accordance with the present invention, the above and other objects can be accomplished by the provision of a battery module constructed in a structure in which secondary batteries or unit modules each having two or more secondary batteries mounted therein are horizontally stacked while the secondary batteries or the unit modules are vertically erected, wherein the battery module includes a base plate on which the unit modules are horizontally stacked while the unit modules are vertically erected, a pair of side plates fixed to the base plate at lower ends thereof such that the side plates are brought into tight contact with outer surfaces of the outermost unit modules, and a housing fixed to the base plate in a structure to surround the unit modules, the housing being provided at the inside thereof with supporting parts for supporting upper ends of the side plates, respectively.

In the battery module according to the present invention, the unit modules horizontally stacked on the base plate are brought into tight contact with each other by the side plates, and the side plates are fixed by the supporting parts of the housing. Consequently, the movement of the unit modules in the thickness direction and the swelling phenomenon of the unit modules are prevented, and therefore, the safety of the battery module is improved while the lowering of the efficiency of the battery module is prevented.

According to the present invention, each unit module may be a secondary battery itself or a small-sized unit module having two or more secondary batteries mounted therein. An example of a unit module having two or more secondary batteries mounted therein is disclosed in Korean Patent Application No. 2006-12303, which has been filed in the name of the applicant of the present patent application. According to the disclosure of this patent application, the unit module is constructed in a structure in which two secondary batteries are mounted to a frame member having input and output terminals while the secondary batteries are in tight contact with each other such that the secondary batteries face each other. The disclosure of the above-mentioned patent application is hereby incorporated by reference as if fully set forth herein.

In a preferred embodiment, the base plate has one or more loading parts for supporting the unit modules while partially contacting lower ends of the unit modules, by which the contact area between the base plate and the unit modules is minimized and a space is formed at the lower ends of the unit modules such that heat generated from the unit modules is effectively removed.

The loading parts are constructed, for example, in a structure in which parts contacting the unit modules are bent upward in the vertical-sectional shape of a flat ridge. Preferably, the loading parts are formed at positions corresponding to opposite ends of the unit modules to support the opposite ends of the unit modules. When the unit modules are horizontally stacked on the base plate, the base plate includes a pair of ridges for supporting the unit modules and a valley formed between the ridges. This structure corresponds to the structure of the inner lower end of a vehicle frame, and therefore, the stability of the battery module is improved when the battery module is mounted in a vehicle.

The unit modules are spaced apart from the base plate at the valley region of the base plate, and therefore, a space is formed at the lower ends of the unit modules. This space may be used as an inlet port and an outlet port for coolant. In this connection, the loading parts may be formed at the middle part of base plate as well as the opposite ends of the base plate such that two valleys are formed at the lower ends of the unit modules, whereby it is possible to separate the coolant inlet port and the coolant outlet port from each other. This structure is disclosed in Korean Patent Application No. 2005-99871, which has been filed in the name of the applicant of the present patent application. The disclosure of the above-mentioned patent application is hereby incorporated by reference as if fully set forth herein.

The loading parts, which are located at the opposite ends of the unit modules, may be provided with upward protruding parts constructed in a structure to surround the opposite outer surfaces of the unit modules such that the upward protruding parts prevent the movement of the unit modules in the longitudinal direction while the upward protruding parts assist the side-by-side arrangement of the unit modules.

In a preferred embodiment, at least one of the side plates is coupled to the base plate in a bolt and nut coupling structure while the unit modules are stacked on the base plate. In this case, any one of the base plate and the side plate coupled with each other in the bolt and nut coupling structure preferably has rectangular coupling holes such that coupling regions in the thickness direction of the unit modules can be changed. For example, when rectangular coupling holes are formed in the base plate, it is preferable for the coupling holes to be arranged along the loading parts of the base plate. Here, the coupling between the base plate and the side plates may be accomplished by a coupling structure in which bolts protrude from the lower ends of the side plates at positions which the side plates are brought into contact with the loading parts, the bolts are inserted through the coupling holes, and nuts are threadedly fitted on the corresponding bolts. Alternatively, the coupling between the base plate and the side plates may be accomplished by a coupling structure in which circular coupling holes are formed in the lower ends of the side plate by drilling, bolts are inserted through the circular coupling holes, and nuts are threadedly fitted on the corresponding bolts.

Also, when the coupling holes are formed in the side plates, the side plates are preferably provided at the opposite ends thereof with extension parts which correspond to the flat upper end surfaces of the loading parts and are formed in the longitudinal direction of the loading parts. This is also applied to the case that the circular coupling holes are formed. At this time, the same coupling structure is provided.

In a preferred embodiment, the supporting parts of the housing protrude vertically downward from the inner upper end surface of the housing so as to support at least partially the outer surfaces of the side plates such that the side plates can be brought into tight contact with each other in the stacking direction of the unit modules.

Preferably, the supporting parts are constructed in a structure to support the side plate in an elastically deformed state while strongly fixing the side plates. For example, the supporting parts may be constructed in a "["-shaped structure or a plate-shaped structure. The "["-shaped structure is more preferably used since the "["-shaped structure has wide regions to which a force is applied and can be easily deformed.

The supporting parts protrude from the inside of the housing so as to support the outer surfaces of the side plates constituting the battery module, respectively. The supporting parts may be attached to the inside of the housing while being separated from each other. Preferably, however, the supporting parts are attached to the inside of the housing in an integrated structure.

Also, in order to easily accomplish the coupling between the supporting parts and the side plates, it is preferable for outer surfaces of the side plates, with which the supporting parts are in tight contact, or the inner surfaces of the supporting parts, which are in tight contact with the side plates, to be tapered downward. More preferably, the outer surfaces of the side plates are tapered downward.

In a preferred embodiment, the housing is coupled to the base plate in a bolt and nut coupling structure. Preferably, in order that the housing is coupled with the base plate in the bolt and nut coupling structure, plate-shaped extension parts are formed outward at the loading parts contacting the opposite ends of the unit modules and the side lower ends of the housing. Also preferably, any one of the base plate and the housing has rectangular coupling holes such that coupling regions in the thickness direction of the unit modules can be changed, and the other of the base plate and the housing has bolts protruding therefrom as in the coupling structure between the base plate and the side plates or circular coupling holes.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view illustrating a battery module according to a preferred embodiment of the present invention with a housing mounted at the upper end of the battery module removed;

FIG. 2 is a perspective view illustrating a process for mounting the housing to the battery module shown in FIG. 1;

FIG. 3 is a perspective view illustrating the housing mounted to the battery module shown in FIG. 1;

FIG. 4 is a side view of FIG. 1;

FIG. 5 is a side view of FIG. 3;

FIG. 6 is a front view of FIG. 3; and

FIG. 7 is a perspective view illustrating supporting parts formed in an integrated structure, which are usable for the battery module shown in FIG. 1.

DESCRIPTION OF MAIN REFERENCE NUMERALS OF THE DRAWINGS

100: battery module  110: unit module
120: base plate  130: side plates
140: housing  150: loading part
160: supporting parts

MODE FOR THE INVENTION

Now, a preferred embodiment of the present invention will be described in detail with reference to the accompanying drawings. It should be noted, however, that the scope of the present invention is not limited by the illustrated embodiment.

First, the structure and the assembly process of a battery module according to a preferred embodiment of the present invention will be described in detail with reference to FIGS. 1 to 3.

Referring to these drawings, a battery module 100 includes a plurality of unit modules 110, a base plate 120, a pair of side plates 130, and a housing 140.

The unit modules 110 are horizontally stacked on the base plate 120 while each unit module 110 is vertically erected on one side. Specifically, the unit modules 110 are horizontally stacked on the base plate 120, which has a pair of loading parts 150 for supporting opposite ends of the unit modules 110, such that electrode terminals 111 and 112 of the unit modules 110 are oriented toward the right side on the drawings, and then the side plates 130 are coupled to the base plate 120 such that the side plates 130 are brought into tight contact with the outer surfaces of the outermost unit modules 110a and 110b.

At this time, the side plates 130 are located at the base plate 120 such that lower extension parts 135 protruding from the ends of the side plates 130 are brought into contact with the loading parts 150 of the base plate 120, and the side plates 130 are tightly coupled to the base plate 120 in a bolt and nut coupling structure using rectangular coupling holes (not shown) formed in the base plate 120 and circular coupling holes (not shown) formed in the lower extension parts 135 of the side plates 130.

Subsequently, extension parts 142 of the housing 140 are located at corresponding extension parts 124 of the base plate 120 such that the housing 140 surrounds the outer surfaces of the stacked unit modules 110, and the housing 140 is tightly coupled to the base plate 120 in a bolt and nut coupling structure using coupling holes (not shown).

Supporting parts 160 protrude vertically downward from the inner upper end surface of the housing 140. The supporting parts 160 are mounted to the outer surfaces of the side plates 130 such that the side plates 130 can be brought into tighter contact with the corresponding unit modules 110 in the stacking direction of the unit modules 110. The supporting parts 160 are constructed in a "["-shaped structure in which the supporting parts 160 can apply a force to the side plates 130 over an extended area and the supporting parts 160 can be elastically transformed with ease. In order that the supporting parts 160 can be more easily mounted to the side plates 130, downward taper structures 134 are formed at the upper ends of the outer middle parts of the side plates 130, respectively.

Hereinafter, the structure of the battery module will be further described with reference to the remaining drawings.

FIG. 4 is a side view of the battery module with the housing removed, and FIGS. 5 and 6 are a side view and a front view of the battery module with the housing mounted, respectively.

Referring to FIG. 4, each side plate 130, by which the unit modules 110 are brought into tight contact with each other, is provided with an extension part 135, which extend toward the corresponding loading part 150 such that the lower end of the extension part 135 can be coupled to the base plate 120. The extension part 135 is constructed in a downward taper structure 135a, by which the lower end of the extension part 135, where coupling holes (not shown) are formed, is widened, and the supporting stability is increased while the coupling region is protected.

Referring to FIG. 5, the housing 140 is constructed in a structure in which the side plates 130 are brought into tighter contact with each other in the stacking direction of the unit modules 110 by the supporting parts 160 of the housing 140 while the unit modules 110 are surrounded by the housing 140. The housing 140 is coupled to the base plate 120. The supporting parts 160 support the outer surfaces of the side plates 130 while the supporting parts 160 are elastically deformed within a specific range.

Referring to FIG. 6, the loading parts 150 protrude upward from the base plate 120 in the shape of a ridge. As a result, a space 170 where the unit modules 110 are spaced apart from the base plate 120 is formed between the loading parts 150. This space may be used as an inlet port and an outlet port for coolant. Also, the ridge regions of the loading parts 150 and the valley region of the space 170 of the base plate 120 are constructed in the same structure as an inner lower end (not shown) of a vehicle frame, and therefore, the battery module is stably mounted in a vehicle (not shown).

According to circumstances, upward protruding parts 151 (regions indicated by dashed dotted lines) may be formed at the outer upper ends of the loading parts 150 in a structure to partially surround the opposite outer surfaces of the unit modules 110 such that the upward protruding parts 151 prevent the movement of the unit modules 110 in the longitudinal direction while the upward protruding parts 151 assist the side-by-side arrangement of the unit modules 110.

FIG. 7 is a perspective view typically illustrating supporting parts formed in an integrated structure, which are usable for the battery module shown in FIG. 1.

Referring to FIG. 7, a pair of supporting parts 160 and 161, which supports the outer surfaces of a pair of side plates (not shown) constituting the battery module, respectively, are integrally connected to a frame body 162. This integrated structure may be manufactured by molding the supporting parts 160 and 161 together with the frame body 162, coupling the supporting parts 160 and 161 to the frame body 162 with a high coupling force, or welding the supporting parts 160 and 161 to the frame body 162. In this example, the supporting parts 160 and 161 are coupled to the housing (not shown) together with the frame body 162. Consequently, the coupling force between the supporting parts 160 and 161 and the housing is high, and the side plates are supported by the supporting parts 160 and 161 with a high supporting force.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module according to the present invention has the effect of stably maintaining the stacking structure of secondary batteries or unit modules each having two or more secondary batteries mounted therein, preventing the swelling of the batteries, when gas is generated in the batteries, by virtue of a structure in which the batteries are in tight contact with each other, and maintaining the distance between electrodes of the batteries, thereby maximally restraining the lowering of the battery efficiency. In addition, the battery module according to the present invention is constructed such that a portion of the battery module is formed using the shape of a vehicle in which the battery module is mounted, whereby the battery module is stably mounted in the vehicle and the volume of the battery module in the vehicle is minimized.

The invention claimed is:

1. A battery module constructed in a structure in which secondary batteries or unit modules each having two or more secondary batteries mounted therein are horizontally stacked while the secondary batteries or the unit modules are vertically erected, wherein the battery module comprises:
    a base plate on which the unit modules are horizontally stacked while the unit modules are vertically erected;
    a pair of side plates fixed to the base plate at lower ends thereof such that the side plates are brought into tight contact with outer surfaces of the outermost unit modules; and
    a housing fixed to the base plate in a structure to surround the unit modules, the housing being provided at the inside thereof with supporting parts for supporting upper ends of the side plates, respectively.

2. The battery module according to claim 1, wherein the base plate has one or more loading parts which are bent upward to support the unit modules.

3. The battery module according to claim 2, wherein the base plate has two loading parts, which are formed at predetermined positions of the base plate to support opposite ends of the unit modules.

4. The battery module according to claim 3, wherein the loading parts have protruding parts for surrounding opposite outer surfaces of the unit modules to assist side-by-side arrangement of the unit modules.

5. The battery module according to claim 1, wherein at least one of the side plates is coupled to the base plate in a bolt and nut coupling structure while the unit modules are horizontally stacked on the base plate.

6. The battery module according to claim 5, wherein any one of the base plate and the side plate coupled with each other in the bolt and nut coupling structure has rectangular coupling holes such that coupling regions in the thickness direction of the unit modules can be changed.

7. The battery module according to claim 1, wherein the supporting parts of the housing are constructed in a "["-shaped structure or a plate-shaped structure in which the supporting parts protrude vertically downward from the inside upper end of the housing.

8. The battery module according to claim 1, wherein the supporting parts, which support outer surfaces of the side plates, respectively, are attached to the inside of the housing in an integrated structure.

9. The battery module according to claim 1, wherein outer surfaces of the side plates, with which the supporting parts are in tight contact, are tapered downward such that the side plates are easily assembled to the housing.

10. The battery module according to claim 1, wherein lower ends of the housing are coupled to the base plate in a bolt and nut coupling structure, and any one of the base plate and the housing has rectangular coupling holes such that coupling regions in the thickness direction of the unit modules can be changed.

* * * * *